A. A. SMITH.
DRAFT DEVICE FOR TRACTORS.
APPLICATION FILED JAN. 27, 1920.
1,366,842.
Patented Jan. 25, 1921.
2 SHEETS—SHEET 1.
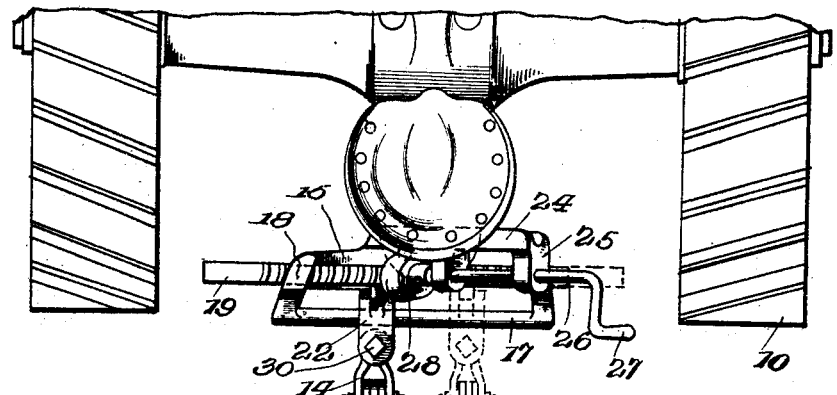
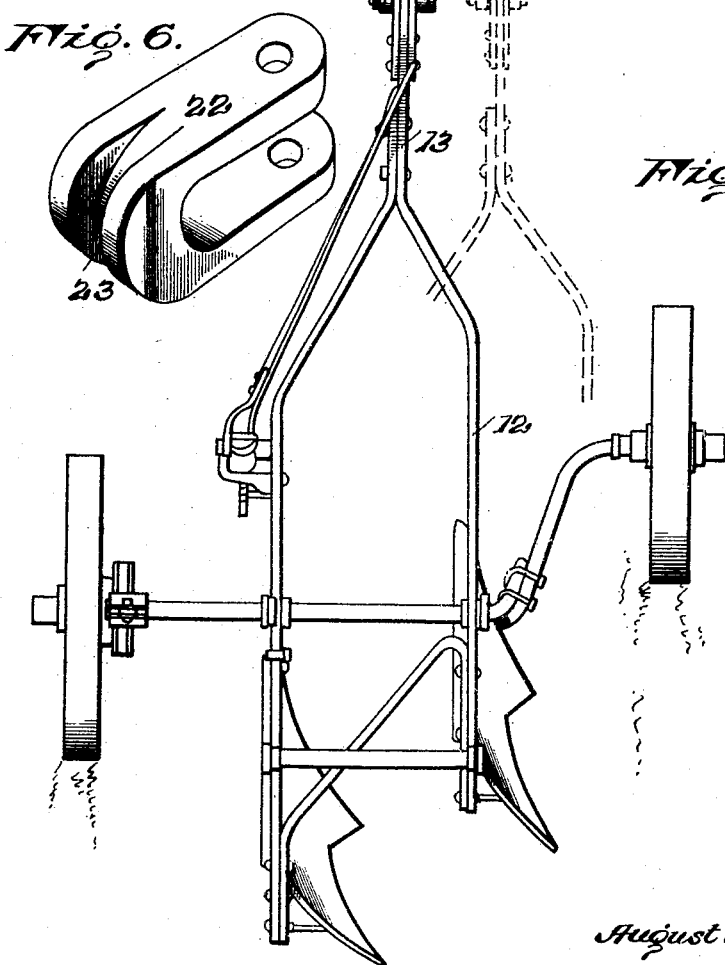
Inventor
August A. Smith
By
Lacey & Lacey, Attorneys

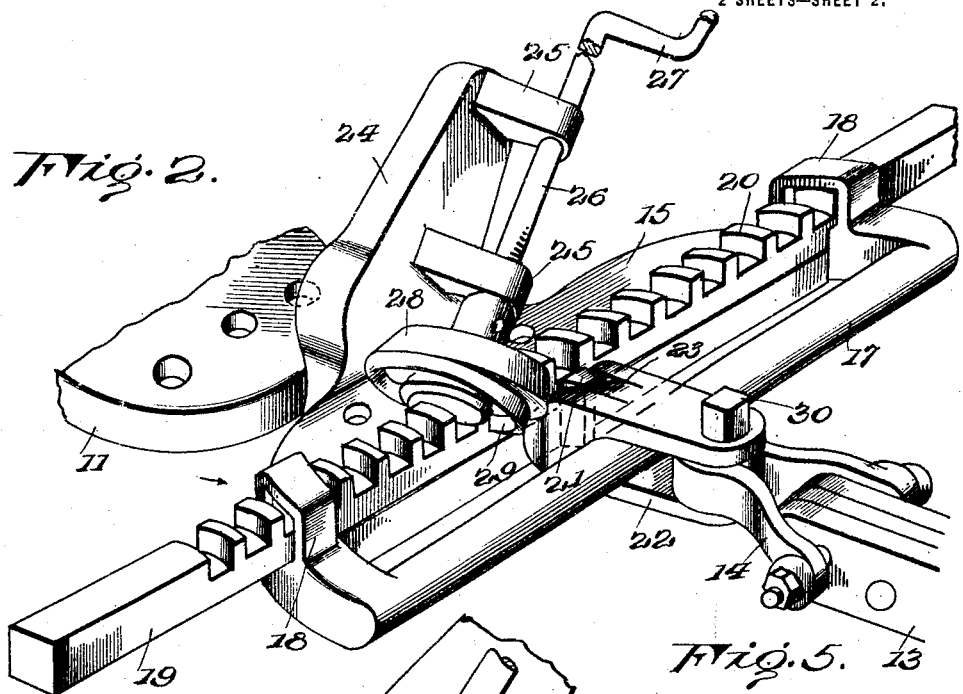
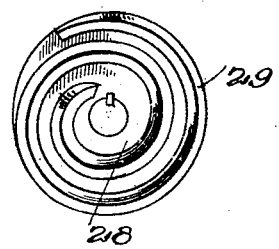
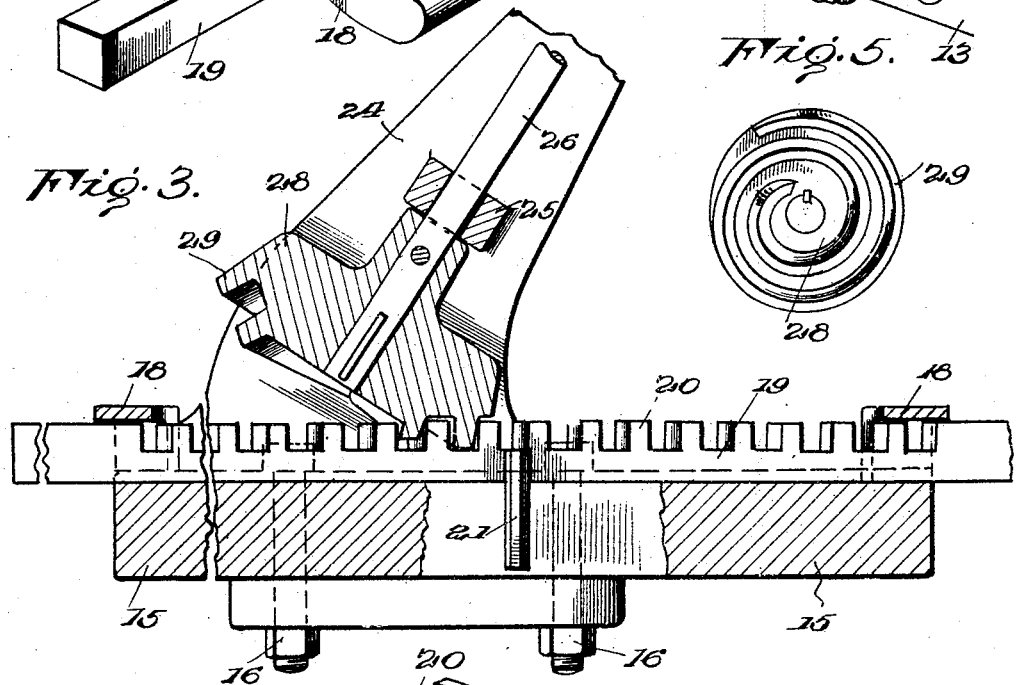
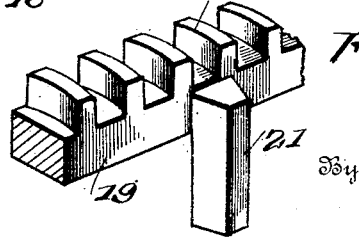

UNITED STATES PATENT OFFICE.

AUGUST A. SMITH, OF SMETHPORT, PENNSYLVANIA.

DRAFT DEVICE FOR TRACTORS.

1,366,842.   Specification of Letters Patent.   Patented Jan. 25, 1921.

Application filed January 27, 1920. Serial No. 354,472.

*To all whom it may concern:*

Be it known that I, AUGUST A. SMITH, a citizen of the United States, residing at Smethport, in the county of McKean and State of Pennsylvania, have invented certain new and useful Improvements in Draft Devices for Tractors, of which the following is a specification.

This invention relates to an improved plow centering device for tractors, being particularly designed for use in connection with tractors of the Fordson type, and has as one of its principal objects to provide a device wherein, without stopping the forward movement of the tractor, the draft upon the plow may be readily shifted.

The invention has as a further object to provide a device which may be easily operated from the driver's seat of the tractor and wherein, when adjusted, the device will be always locked in adjusted position.

And the invention has as a still further object to provide a device wherein, without regard to the adjustment of the draft upon the plow, free pivoting of the plow relative to the tractor will be permitted.

Other and incidental objects will appear hereinafter.

In the drawings:

Figure 1 is a plan view showing my improved device in position upon a tractor of the Fordson type and illustrating a conventional plow attached to the device, Fig. 2 is a perspective view showing the device on an enlarged scale, Fig. 3 is a fragmentary longitudinal section taken medially through the device, Fig. 4 is a fragmentary detail of the rack bar employed, Fig. 5 is a plan view of the adjusting worm used, and Fig. 6 is a detail perspective view of the clevis employed.

Referring now more particularly to the drawings, I have, for convenience, shown the present invention in connection with a tractor 10 of the Fordson type. As previously intimated, my improved device is particularly designed for use in connection with this type of tractor. However, I do not wish to be limited in this regard since the device will operate with entire efficiency wherever found applicable. The usual draft plate at the rear of the tractor is indicated at 11. I have also shown in connection with the tractor, a conventional plow 12, this plow being provided with the usual beam 13 to the forward end of which is pivotally connected a clevis 14. Heretofore, it has been customary to pivotally connect this clevis directly to the plate 11 by the use of a coupling pin and as will be observed, the plate is provided with a series of transversely spaced openings adapted to selectively receive the pin so that the draft upon the plow may be adjustably shifted. However, this construction is highly inconvenient in that, in order to shift the connection between the plow and tractor, it is necessary to stop the tractor when the driver must leave his seat in order to gain access to the coupling pin previously mentioned. In plowing hilly ground, it is often necessary to thus shift the draft upon the plow since the plow has a tendency to work in a direction down the hill and accordingly, the draft upon the plow must be shifted in order to hold the plow upon the land. Obviously, therefore, considerable time is lost, not to mention the inconvenience experienced. The present invention seeks to eliminate the disadvantages mentioned.

In carrying the invention into effect, I employ a draft head 15 provided with spaced openings therethrough and which, in practical use, is rested upon the plate 11 of the tractor to be detachably secured thereto by spaced bolts or other approved fastenings 16 extending through the draft head and plate. The draft head is formed with a horizontal draft bar 17 lying in spaced parallel relation to the body of the head and joined at its ends to said body by suitable connecting webs, these parts being preferably integral. Thus, the bar will extend transversely of the tractor and may be of any approved length, the bar being circular in cross section. Upstanding from the draft head at its ends are keepers 18 and slidable through these keepers is a rack bar 19 freely received in a suitable channel in the upper side of the body of the head. The bar lies in spaced parallel relation to the draft bar 17 at the rear thereof and is formed upon its upper side with a series of arcuate teeth 20. At its outer side this bar carries, as particularly shown in Fig. 4, a depending lug 21 slidable along the front edge of the body of the head and, as will be observed, said lug is substantially wedge-shaped, being formed with beveled side faces. Embracing the draft bar 17 to coact with this lug is a clevis 22. The clevis is, of course, mounted to slide freely along the bar and the bight of the clevis is, as particularly shown in Fig. 6, provided in its outer face with a channel or groove 23 to freely receive the lug 21, the side walls of said groove being beveled to coact with the beveled side faces of the lug. The clevis is thus operatively connected with the rack bar 19 so that when the rack bar is shifted longitudinally, the clevis will be moved along the draft bar. At the same time, the clevis may, since the draft bar is circular in cross section, freely rock or swing upon this bar at substantially right angles to the rack bar, the lug 21 riding within the groove 23 when the clevis is thus swung.

Integrally formed on or otherwise connected to the draft head at its inner edge is an upstanding arm 24 arranged at a point substantially midway between the ends of the head. As will be observed, the arm is tilted or directed obliquely toward one end of the head, the arm extending, as particularly shown in Fig. 1, upwardly at the right hand side of the driver's seat of the tractor, and formed on the arm are spaced ears 25. Journaled through these ears is an operating shaft 26 provided at its upper end with a crank 27 which may be readily reached from the driver's seat of the tractor. Fixed to the lower end of said shaft is a worm 28 coacting with the rack bar 19. As particularly shown in Figs. 3 and 5, this worm is provided upon its lower face with a spiral rib 29 originating at one end adjacent the axis of the worm and terminating at its other end at the periphery of the worm, the end portions of the rib being gradually reduced in height and being feathered. Between its end portions the rib is of substantially uniform height to engage between the teeth of the rack bar but the lower end of the worm is so formed that the rib gradually ascends from its outer end toward its inner end to compensate for the inclination of the worm with respect to the rack bar. Consequently, when the shaft 26 is rotated in a clockwise direction, the feathered outer end portion of the rib will engage the convex faces of the teeth 20 successively for shifting the rack bar to the left while, when the shaft is rotated in a counter-clockwise direction, the feathered inner end portion of the rib will engage the concave faces of the teeth successively for shifting the rack bar to the right. The end portions of the rib overlap slightly so that when either end of the rib is advanced into engagement with a tooth, the middle portion of the rib will lie between said tooth and the next preceding tooth. Therefore, the intermediate portion of the rib will, as the worm is rotated, serve to advance the bar in either one direction or the other, depending upon the direction of rotation of the worm, so that the end portions of the rib may selectively enter freely between the teeth of the rack bar while the intermediate portion of the rib will always sustain the strain of the longitudinal thrust upon the bar. Further, by this construction, the intermediate portion of the rib will, regardless of the position of the worm in its rotative movement, always lie between a pair of teeth of the rack bar for firmly locking the bar against longitudinal movement. Accordingly, after the rack bar has been adjusted in either one direction or the other, the worm will serve to lock the bar in any position of adjustment.

As will now be observed, the clevis 14 of the plow is pivotally connected to the clevis 22 by a suitable coupling pin 30. Thus, the plow may swing relative to the tractor about the axis of this pin. Furthermore, since the clevis 22 is mounted to swing upon the draft bar 17, the plow and tractor may move relative to each other vertically when passing over rough ground. To shift the draft upon the plow, it is, as will now be appreciated, simply necessary for the driver to turn the crank 27 in the desired direction for shifting the rack bar 19 and move the clevis 22 along the draft bar. As will be seen, this may be accomplished without the driver leaving his seat. I accordingly provide an arrangement whereby the draft upon the plow may, without stopping the tractor, be readily shifted. Further, the clevis 22 may be readily moved from end to end of the draft bar in back-furrowing or side hill plowing.

Having thus described the invention, what is claimed as new is:

1. A device of the character described including a draft head, load coupling means shiftable laterally thereon, a rack bar shiftable upon the head and operatively connected to said load coupling means, an arm carried by the head, a vertically inclined shaft journaled upon said arm, and a worm carried by the shaft and provided upon its lower face with a rib to coact with the teeth of the rack bar whereby the said shaft may be rotated for shifting the bar and shifting said load coupling means.

2. A device of the character described including a draft head provided with a draft bar, a load coupling clevis slidable along said bar and also mounted to rock thereon, the clevis being provided with a groove, a rack bar slidable upon the head and provided with a lug engaging in the groove of the clevis for coupling the clevis to the rack bar to shift therewith but permitting rocking movement of the clevis, and a worm mounted to coact with the rack bar for shifting the rack bar.

3. A device of the character described including a draft head having spaced upstanding keepers and provided with a draft bar, a clevis slidable along said bar and also mounted to rock thereon, a rack bar slidably connected with the head by said keepers and provided with means coacting with the clevis whereby the clevis will be shifted with the bar, and means carried by the head for shifting the bar.

4. A device of the character described including a draft head, a load coupling clevis shiftable laterally upon the head and also mounted for rocking movement, means for shifting the clevis laterally, and coacting means between the first means and the clevis coupling the clevis with the first means to be shifted thereby and slidably coacting with the back of the bend of the clevis whereby the clevis may be rocked.

In testimony whereof I affix my signature.

AUGUST A. SMITH. [L. S.]